Figure 1:
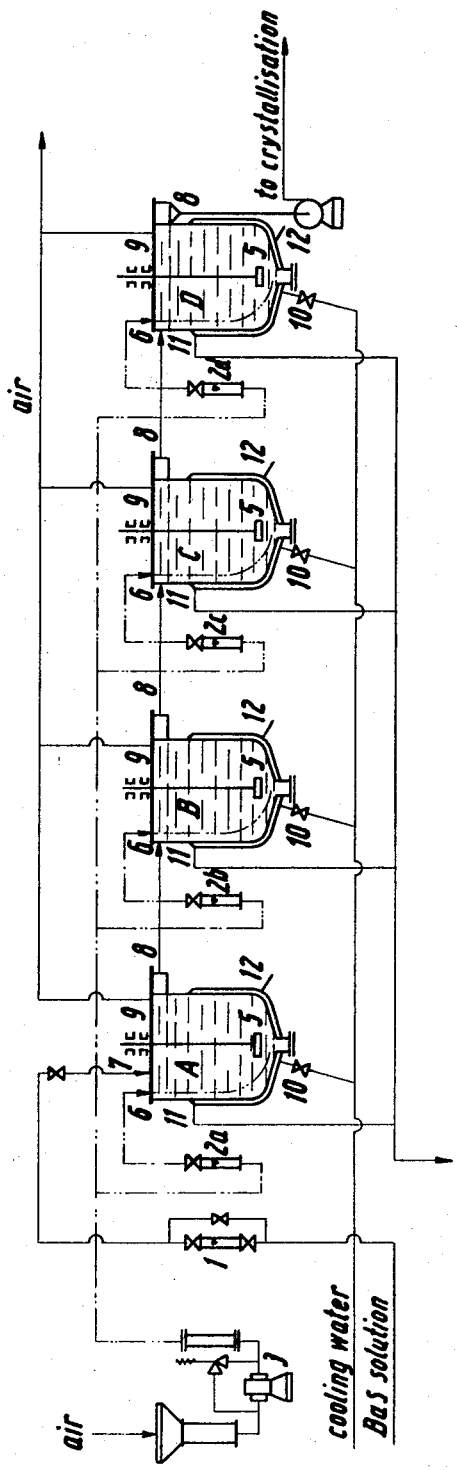

United States Patent
Kemeny et al.

[15] 3,652,217
[45] Mar. 28, 1972

[54] METHOD FOR THE PRODUCTION OF BARIUM HYDROXIDE

[72] Inventors: Giulio Kemeny, Massa; Mario Gaboardi, Verona; Aldo Santini; Mario Testori, both of Massa; Paul-Dietrich Reinhardt, Marina Di Massa, all of Italy; Hartmut Simoleit; Ludwig Walter, both of Hanover, Germany

[73] Assignee: Kali-Chemical Aktiengesellschaft, Hanover, Germany

[22] Filed: Sept. 11, 1969

[21] Appl. No.: 857,049

[30] Foreign Application Priority Data

Sept. 11, 1968 Germany.................P 17 92 505.2
Sept. 12, 1968 Germany.................P 17 92 515.4

[52] U.S. Cl..................................23/186, 23/115
[51] Int. Cl..................................C01f 11/10, C01b 17/64
[58] Field of Search............................23/186, 1, 115

[56] References Cited

UNITED STATES PATENTS 3,424,549    1/1969    Godfrey..................................23/1 R

FOREIGN PATENTS OR APPLICATIONS 365,198    1/1932    Great Britain............................23/186
365,651    1/1932    Great Britain............................23/186

Primary Examiner—Oscar R. Vertiz
Assistant Examiner—G. Alvaro
Attorney—Christen and Sabol

[57] ABSTRACT

The continuous production of barium hydroxide by the oxidation of a barium polysulfide-containing-barium sulfide solution using oxygen-containing gases is carried out between 45° and 80° C. in several stages placed in series. The oxidation is stopped at a point within specified values. Also, certain molar ratios of total sulfur to monosulfide sulfur in the barium sulfide-starting solution are maintained. Liquors obtained during recrystallization can be purified by a stagewise oxidation.

17 Claims, 2 Drawing Figures

METHOD FOR THE PRODUCTION OF BARIUM HYDROXIDE

PRIOR ART

The production of barium hydroxide by hydrolysis of a barium sulfide solution with the simultaneous introduction of air is known.

Thus the German specification No. 415,897 describes a method for the production of barium hydroxide, in which the raw barium sulfide is oxidized by air in a hydratic form until a sample of the reaction mass indicates that no further increase in alkalinity is taking place. From the reaction mass the barium hydroxide is extracted with hot water.

The German specification No. 519,819 describes the production of barium hydroxide by the partial oxidation of barium sulfide solutions with simultaneous production of barium polysulfide at a temperature above 50° C. In the associated German patent of addition No. 526,796 it is stated that the oxidation can be carried out at temperatures below 50° C. if sulfur in a dissolved form or polysulfide is present in the barium sulfide solution.

All these methods share the feature that they are operated discontinuously. They have up to this date not been accepted in industry.

DESCRIPTION OF THE INVENTION

It has now been found that the oxidation method for the production of barium hydroxide can be continuously carried out if the oxidation using oxygen containing gases is carries out in several stages placed in series with a simultaneous cooling action, the suspension produced is continuously removed and after the removal of the suspended material barium hydroxide is crystallized out by cooling and separated.

It has been found in fact that the oxidation speed, although relatively fast initially, considerably decreases as the reaction progresses. The difficulties which result form this for continuous operation are eliminated in accordance with the invention if the oxidation is carried out in several stages placed in series. With this manner of operation the main part of the reaction occurs in the first vessels or reaction containers and is completed in the following stages.

A suitable apparatus for carrying out the method is shown in the accompanying drawing. It comprises a battery of four reaction vessels connected in series A, B, C, D, which are provided with a cooling casing or jacket 12 and an efficient stirring device 5. They are also each provided with an air compressor 3, a flow rate measuring instrument 1 for the supply of barium sulfide solution and the flow rate measuring instruments 2a, 2b, 2c and 2d for regulation of the air flow rate.

The apparatus is operated as follows.

The barium sulfide solution to be oxidized is pumped via the flow measuring instrument 1 from above at 7 into the reaction vessel A. Simultaneously air is pressed in by the compressor 3 through the flow rate measuring instrument 2a at 6 through an immersed tube below the stirring device into the barium sulfide solution. By vigorous stirring, for example by means of a basket-type stirrer, the solution and air are intensively and very vigorously mixed. The solution flows through the outlet 8 to a second oxidation vessel B, constructed in exactly the same manner, into which air is blown in the same way. This procedure is carried out in a similar manner also in the third and fourth oxidation vessel C and D. For cooling the oxidation vessels are provided each with a cooling jacket 12 into which cooling waters enters at 10 and is discharged at 11. Air leaves the reaction vessels at 9. The completely oxidized solution leaves the fourth oxidation vessel D at 8. The suspended materials are separated from the suspension (solution). The solution is then pumped into the ensuing crystallization installation.

It is to be emphasized that the method in accordance with the invention can also be carried out in more than four vessels connected in series. It is also possible to carry out the oxidation in less stages. For economic reasons however, not less than three stages should be used. Preferably four to six stages are used. The number of vessels is determined inter alia by the desired daily production, since the size of the reaction space is limited by the heat of reaction to be removed by cooling.

The reaction vessels can all have the same size but alternatively can also have different dimensions. Equal volumes for the vessels mean that the time spent by the barium sulfide solution in all vessels is the same. In the case of different dimensions of the reaction vessels the first stages should have smaller volumes and therefore hold the liquid for a shorter time, while in the following stages the time spent by the liquid in them is increased in adaption to the reduced speed of reaction, the sizes of these reaction vessels being greater.

Figure 2:
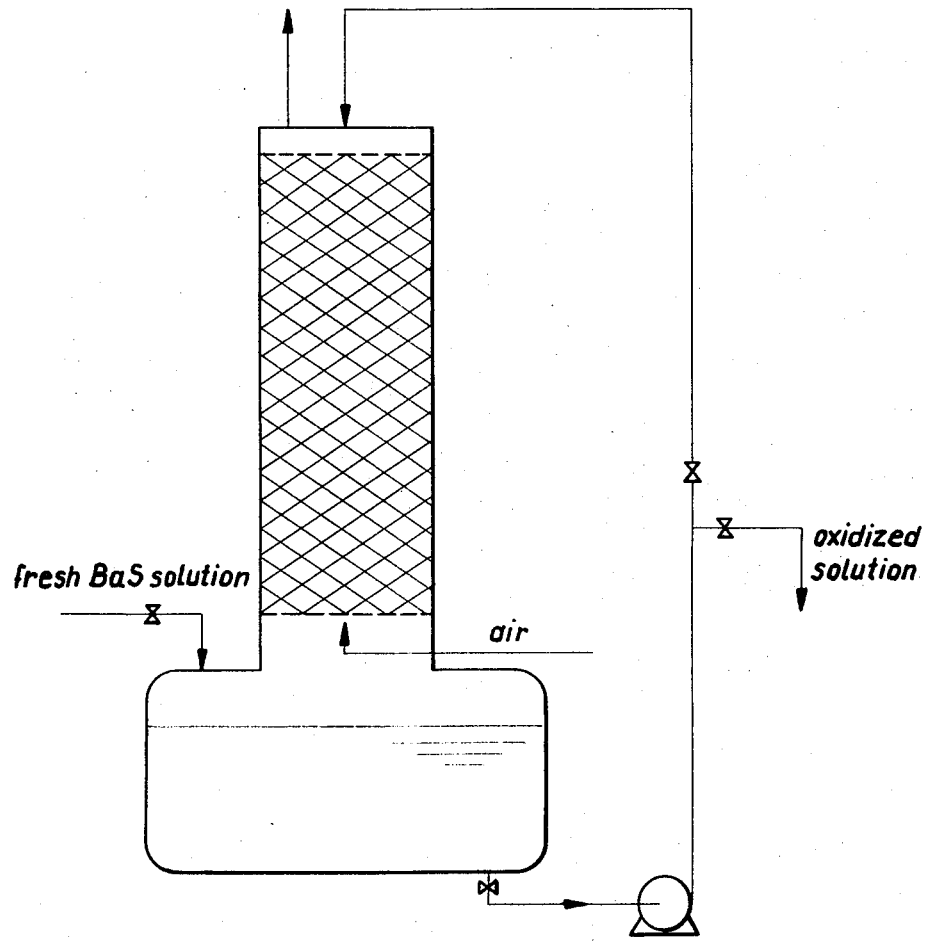

Another suitable apparatus for carrying out the method in accordance with the invention employs oxidation columns which are provided with external and/or internal cooling means to suit the amount of heat to be removed. The columns (see FIG. 2) provided with diverting means such as baffles and/or fritted material for bringing about an intensive mixing of the barium sulfide solution with air. The mixing can also be brought about by constructing the column as a stirring column. however, in the case of the use of oxidation columns a higher air pressure is necessary.

The oxidation column can be divided by partitions into several reaction spaces. The incorporation of horizontal partitions is, however, not absolutely necessary; the column is then to be considered as a plurality of reaction spaces merging into one another.

Preferably air and barium sulfide solution are caused to flow in countercurrent so that the solution which has already been substantially oxidized comes into contact with the air containing most oxygen and the air which owing to the oxidation reaction has lost most oxygen serves for oxidation of the fresh barium sulfide solution entering the apparatus.

It is naturally to be understood that instead of air it is possible to use a different oxygen containing gas or pure oxygen for purposes of oxidation.

A particular difficulty encountered here-to-fore with oxidation was that during the blowing-in of the air so much foam was formed that rational operation was made very difficult. It has been found that by the addition of flocculation agents the foam formation can be reduced or prevented. Even a small quantity of 4 to 5 g. per cubic meter of solution prevents foam formation practically completely. Naturally a greater quantity of flocculation agent may be necessary depending on the composition of the solution. However, more than 10 g. per cubic meter should only be necessary in rare exceptional cases. Particularly effective flocculation agents have found to be those based on polyacrylic acid and derivatives of this compound.

It is recommended that the oxidation should be terminated in the last stage before half of the original barium sulfide present in the solution is reacted to barium hydroxide. A suitable factor indicating the point in time for terminating the reaction is the value of the iodine titer. It is determined as follows:

Ten ml. of the solution to be determined are filled up to 500 ml. In a beaker 20 ml. 1/10n iodine solution are acidified with 5 ml. 10 percent hydrochloric acid. To this hydrochloric acid iodine solution is added from a pipette 50 ml. of the diluted solution to be investigated; while stirring with a glass rod the back-titration is carried out with 1/10n sodium thiosulfate solution. Starch is used as an indicator.

The reaction should be terminated when the iodine titer, expressed as the amount in ml. of $1/10n$ $I_2$ solution required per ml. of solution to be examined gives a value after oxidation which is 0.5 to 3, preferably 1 to 3 units greater than the half of the value before the oxidation. On exceeding said degree of oxidation the following reactions occur preferentially $$BaS_3 + Ba(OH)_2 + 2\ \text{½}O_2 \rightarrow BaS_2O_3 + BaSO_3 + H_2O$$
$$BaS_2O_3 + Ba(OH)_2 + O_2 \rightarrow 2\ BaSO_3 + H_2O$$

that is to say sulfur-barium-oxygen compounds of low solubility are formed which contaminate the precipitated barium hydroxide, and decrease the yield.

In order to keep the amount of these compounds as low as possible and to reach an optimum valve as regards the speed of oxidation, it is recommended that the molar ratio of total sulfur to monosulfide sulfur in the barium sulfide starting solution amounts to 1.2 to 2, preferably 1.6 to 1.8.

The most favorable oxidation temperatures are found to lie between 45° and 80° C., preferably between 50° to 55° C. The oxidation temperature depends to a certain extent on the molar ratio of total sulfur to monosulfide sulfur in the starting solution. In the case of a molar ratio of 1.2 to 1.5 the oxidation temperature should be between 65° to 80° C., preferably between 68° and 75° C. while in the case of a molar ratio of 1.6 to 1.9 the temperature should be between 45° to 60° C. and preferably between 48° to 53° C.

The barium hydroxide obtained in accordance with the method of the invention has a relatively high degree of purity and can be purified still further by recrystallization. Solutions obtained during such recrystallization and mother liquors can also be purified additionally be an stagewise oxidation at temperatures between 65° and 90° C., preferably 70° to 80° C., this being carried out by separating off the sparingly soluble barium compounds produced during oxidation. This oxidation is also conveniently carried out in the apparatus shown in the figure, it being possible in some cases to use less reaction vessels than is the case with the oxidation of barium sulfide solution.

In order to prevent barium hydroxide losses owing to the reaction

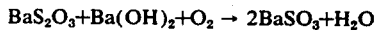
$$BaS_2O_3 + Ba(OH)_2 + O_2 \rightarrow 2BaSO_3 + H_2O$$

the oxidation is terminated when the BaS content of the mother liquor has been reduced to a value of 0.15 percent, preferably 0.08 to 0.10 percent.

In this case as well, flocculation agents should be added in order to prevent foam formation. Even a small quantity of flocculation agent of approximately 4 to 7 g. per cubic meter of liquor brings about a prevention of the strong foam formation occurring otherwise during oxidation.

EXAMPLE 1

A barium sulfide solution containing polysulfide consisting of
16.6 % BaS
0.9 % Ba(OH)$_2$
2.2 % S (predominantly as polysulfide)
80.3 % H$_2$O that is to say with a ratio of total sulfur to sulfide sulfur of 1.7 and an iodine titer of 23.2 ml. 1/10n iodine solution per ml. of solution were continuously fed into the oxidation apparatus shown in the figure after the addition of 4.5 g. Separan NP 20 (polyacrylamide polymer, Trademark of the Dow Chemical Corporation) per cubic meter of barium sulfide solution.

Into the reactors of the oxidation apparatus 30 cubic meter of air per cubic meter of solution were blown in, that is to say 7.5 cubic meter air per cubic meter of solution in each vessel. During oxidation the temperature was held at about 55° C. by cooling. The suspension emerging from the last reaction vessel had the following composition
8.3 % BaS
8.9 % Ba(OH)$_2$
3.5 % S (predominantly as polysulfide)
0.7 % BaS$_2$O$_3$ +(+ This includes as well as BaS$_2$O$_3$ all sparingly soluble barium-sulfide-oxygen compounds, that is to say also BaSO$_3$, BaSO$_4$ and others, and also BaCO$_3$.
78.6 % H$_2$O The suspension had an iodine titer of 12.6 ml. 1/10n iodine solution per ml. of suspension. In order to remove BaS$_2$O$_3$ and other sparingly soluble barium compounds such as BaCO$_3$ and BaSO$_3$ the suspension was decanted into a separating funnel and then cooled to 15° C; thereby took place the crystallization of the Ba(OH)$_2$·8H$_2$O. The latter was filtered off and had the following composition
80.4 % Ba(OH)$_2$·8H$_2$O
0.4 % BaS
2.0 % BaS$_2$O$_3$
17.2 % H$_2$O Per metric ton of starting solution 152.3 kg. of raw barium hydroxide and 848 kg. of mother liquor of the following composition were obtained
9.5 % BaS
2.7 % Ba(OH)$_2$
4.2 % S (predominantly as barium polysulfides)
83.6 % H$_2$O Sixty-six percent of the mother liquor were recycled in order to dissolve fresh barium sulfide; the remaining mother liquor was removed from the barium hydroxide process and used for production of other barium compounds. There is thus an increase in yield of barium hydroxide from 37.4 to 76.8 percent with respect to the barium introduced. Since, however, the residual 34 percent mother liquor can be used to produce barium compounds, yield of approximately 96 percent, with respect to barium, can be obtained providing that there is a quantitive processing of the residual 34 percent mother liquor.

EXAMPLE 2

A mother liquor with the following composition
4.10 % Ba(OH)$_2$
0.26 % BaS (includes all soluble sulfur compounds)
0.44 % BaS$_2$O$_3$ (includes all sparingly soluble barium compounds)
95.20 % H$_2$O produced during recrystallization of raw barium hydroxide had 7 g. Separan NP 20 added per cubic meter and after being heated to 80° C. was passed continuously in the first vessel of an oxidation apparatus comprising two vessels. Simultaneously air was injected into the vessel and mixed by vigorous stirring intensively with the mother liquor. For completing the oxidation reaction the solution flowed from the exit of this vessel to a second oxidation vessel, provided also with a stirring device and air supply means. Per cubic meter of mother liquor 32 cubic meters of air were injected into the oxidation apparatus. The time spent in the apparatus amounts to 1.6 hours per cubic meter of mother liquor; the oxidation temperature was 80° C.

From the second vessel the oxidized suspension is continuously removed and filtered. Per 1,000 kg. of mother liquor 35.7 kg of wet barium thiosulfate of the composition
64.7 % BaS$_2$O$_3$ (includes all sparingly soluble barium compounds)
35.3 % H$_2$O were obtained after filtration, together with 964.3 kg. of purified mother liquor of the composition
2.40 % Ba(OH)$_2$
0.10 % BaS (includes all soluble sulfur compounds)
0.50 % BaS$_2$O$_3$ (includes all sparingly soluble barium compounds)
97.0 % H$_2$O This mother liquor is used again for dissolving raw barium hydroxide.

We claim:
1. A method for the production of barium hydroxide by oxidation of a barium polysulfide-containing barium sulfide solution using oxygen containing gases comprising the steps of (i) continuously oxidizing a solution, in which the molar ratio of total sulfur to monosulfide sulfur is 1.2 to 2.0, in several states that are in series, with simultaneous cooling at a temperature between 45° and 80° C. (ii) terminating the oxidation when the iodine titer of the oxidized solution, expressed in ml. of 1/10 N iodine solution per ml. barium sulfide solution, is 0.5 to 3 units greater than half the corresponding value before oxidation, said oxidized material containing suspended material and dissolved barium hydroxide, (iii) continuously removing the suspension, (iv) separating the suspended material from the suspension, (v) cooling the solution to crystallize out the barium hydroxide, and (vi) removing the barium hydroxide.

2. A method in accordance with claim 1 in which the iodine titer is 1 to 3 units greater than half of the corresponding value before oxidation.

3. A method in accordance with claim 1 wherein a fluocculation agent selected from the group consisting of polyacrylic acid and derivatives of polyacrylic acid is added to said barium sulfide solution.

4. A method in accordance with claim 1 in which the molar ratio of total sulfur to monosulfide sulfur in the barium sulfide starting solution is 1.6 to 1.8.

5. A method in accordance with claim 1 in which the oxidation is carried out at a temperature between 50° and 55° C.

6. A method in accordance with claim 1 in which the oxidation is carried out at a molar ratio of total sulfur to monosulfide sulfur in the barium sulfide solution of 1.2 to 1.5 at temperatures of 65° to 80° C.

7. A method in accordance with claim 6 in which the oxidation is carried out at a molar ratio of total sulfur to monosulfide sulfur in the barium sulfide solution of 1.2 to 1.5 at temperatures of 68° to 75° C.

8. A method in accordance with claim 1 in which the oxidation is carried out at molar ratio of total sulfur to monosulfide sulfur in the barium sulfide solution of 1.6 to 1.9 at temperatures between 45° and 60° C.

9. A method in accordance with claim 8 in which the oxidation is carried out at a molar ratio of total sulfur to monosulfide sulfur in the barium sulfide solution of 1.6 to 1.9 at temperatures between 48° and 53° C.

10. A method in accordance with claim 1 in which the solution and the mother liquors occurring on recrystallization are subjected to oxidation in stages at a temperature between 65° and 90 C. and sparingly soluble barium compounds produced by this process step are removed from the reaction product.

11. A method in accordance with claim 9 in which the stepwise oxidation of the mother liquor is carried out at a temperature between 70° and 80° C.

12. A method in accordance with claim 10 in which the oxidation is interrupted when the BaS content of the oxidized mother liquor has been reduced to a value of 0.15 percent 13. A method in accordance with claim 11 in which the oxidation is interrupted when the BaS content of the oxidized mother liquor has been reduced to a value between 0.08 to 0.1 percent.

14. A method in accordance with claim 1 in which the oxidation is carried out in several reaction vessels placed in series which are provided with air supply means, stirring means and a cooling jacket, the barium sulfide solution running through the vessels one after the other and being mixed intensively in every vessel with air.

15. A method in accordance with claim 1 in which the oxidation is carried out in an oxidation column whose temperature is set by internal cooling or external cooling or both and provided with means such as baffles or fritted material or both for mixing intensively the air with barium sulfide solution.

16. A method in accordance with claim 1 in which the oxidation is carried out in a stirring column.

17. A method in accordance with claim 1 in which the oxidation is terminated in the end stage before half of the barium sulfide present in the barium sulfide solution has been reacted.

* * * * *

UNITED STATES PATENT OFFICE
CERTIFICATE OF CORRECTION

Patent No. 3,652,217　　　　　　　　　Dated March 28, 1972

Inventor(s) Giulio Kemeny et al

It is certified that error appears in the above-identified patent and that said Letters Patent are hereby corrected as shown below:

On the cover sheet [73], in the name of the assignee, "Kali-Chemical" should read -- Kali-Chemie --.

Signed and sealed this 7th day of November 1972.

(SEAL)
Attest:

EDWARD M. FLETCHER, JR.　　　　　　　ROBERT GOTTSCHALK
Attesting Officer　　　　　　　　　　Commissioner of Patents